Oct. 12, 1965  A. C. ARBOGAST  3,210,984
APPARATUS FOR MAKING PIPE FITTINGS
Filed March 14, 1960  3 Sheets-Sheet 1
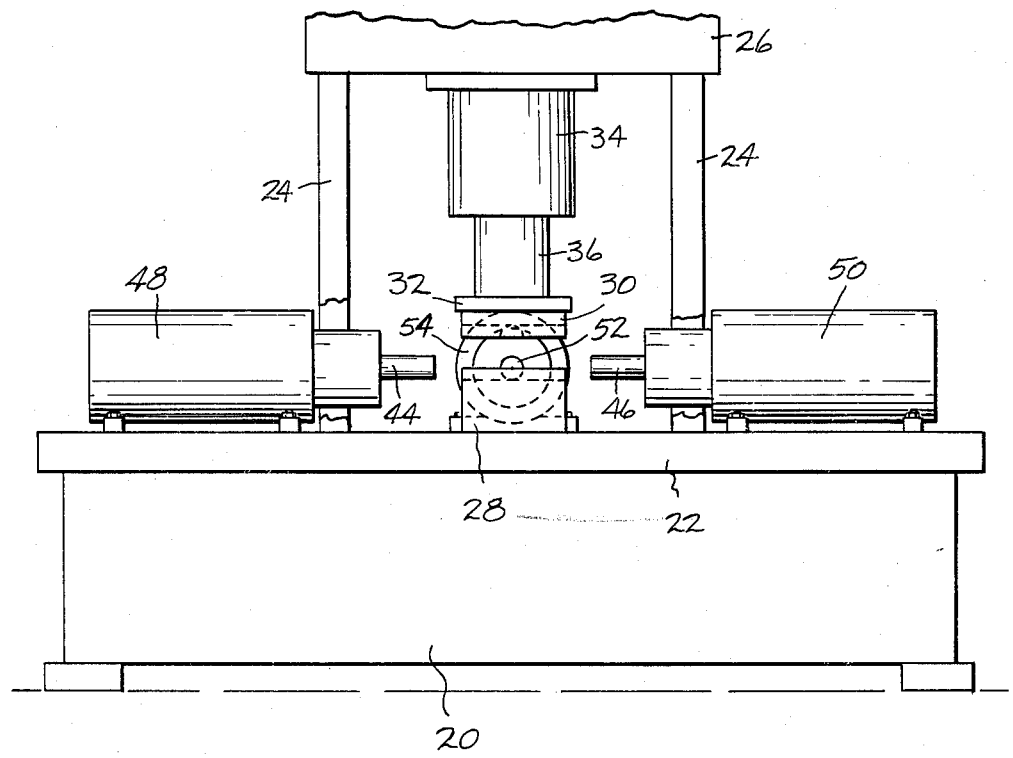
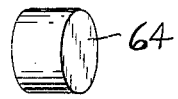
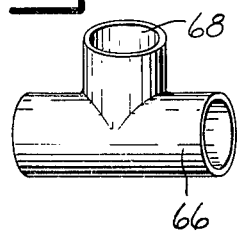
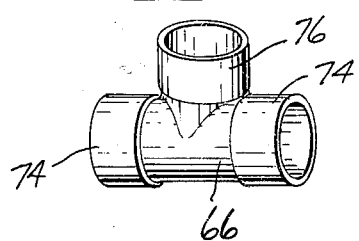
INVENTOR.
ALFRED C. ARBOGAST
ATTORNEY

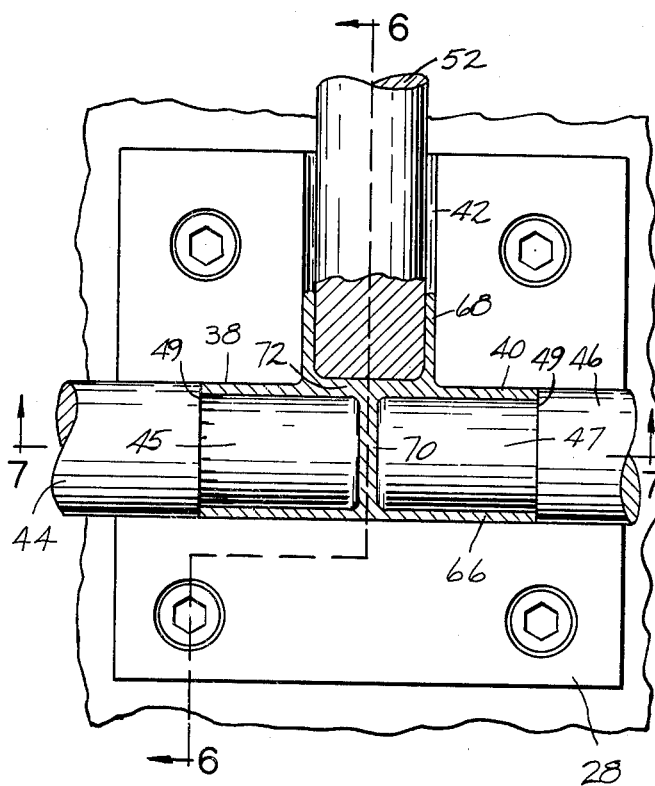
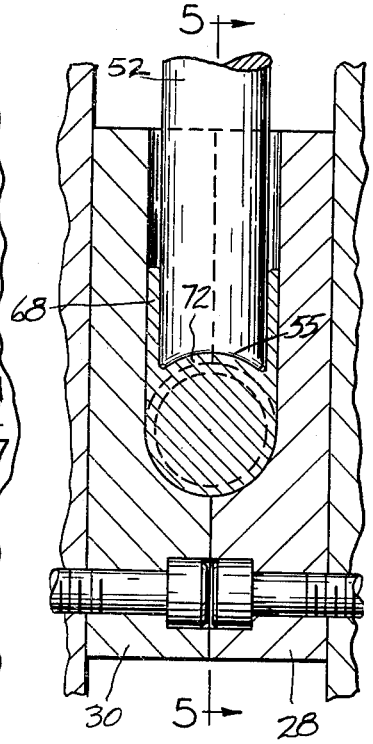
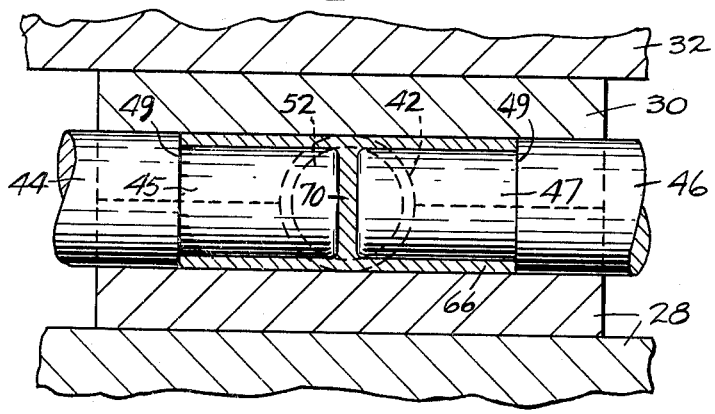

Oct. 12, 1965   A. C. ARBOGAST   3,210,984
APPARATUS FOR MAKING PIPE FITTINGS
Filed March 14, 1960   3 Sheets-Sheet 3
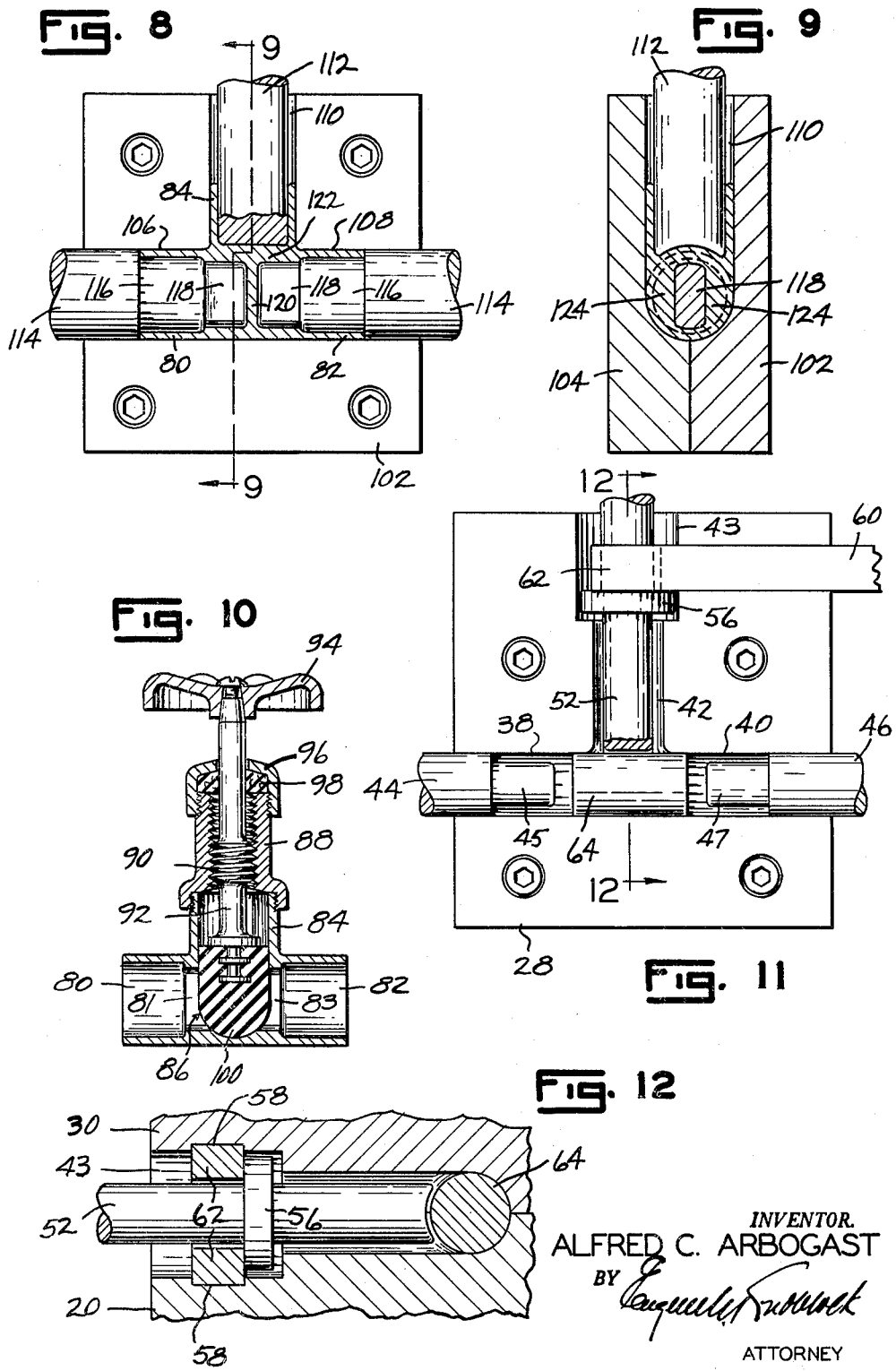
INVENTOR.
ALFRED C. ARBOGAST
BY
ATTORNEY United States Patent Office 3,210,984
Patented Oct. 12, 1965

3,210,984
APPARATUS FOR MAKING PIPE FITTINGS
Alfred C. Arbogast, 1255 Oak St., Elkhart, Ind.
Filed Mar. 14, 1960, Ser. No. 14,660
1 Claim. (Cl. 72—402)

This invention relates to a method and apparatus for making pipe fittings.

Pipe fittings, such as those having T-shaped bodies, are now commonly manufactured by casting the same from metal or by working tubular stock to produce a branch therein. Cast metal fittings are commonly characterized by heavy wall thickness, comparatively high cost, and a certain degree of porosity which renders them unsuitable for certain uses, such as in the refrigeration art where they are used in refrigeration system employing refrigerating gases. Wrought fittings formed by reshaping a pipe or tube, as by the methods and apparatus disclosed in my Patent No. 2,557,403, dated June 19, 1951, and the patents of W. D. Kraemer, No. 2,736,949, dated March 6, 1956, and No. 2,819,697, dated January 14, 1958, are of lighter weight and less wall thickness than cast fittings and are not subject to porosity which permits escape of gases through the walls thereof. However, such methods of producing wrought fittings which have been developed heretofore require the use of tube stock as the starting material, and such stock is quite costly compared to the cost of other forms of metal, such as solid rod or bar stock.

It is the primary object of this invention to provide a method and apparatus for cold-forming a thin walled wrought fitting from solid rod or bar stock of ductile or malleable metal.

A further object is to provide a method and apparatus for forming a T-shaped fitting of desired wall thickness and size and configuration from solid stock rapidly and simply by a single operation of forming apparatus.

A further object is to provide an apparatus for producing quickly from solid ductile or malleable metal stock a thin walled T-shaped fitting which is complete except for the need for removing therefrom internal webs or diaphragms and for trimming or finishing the same to desired length and true desired configuration of its ends.

A further object is to provide apparatus for producing a T-shaped fitting, wherein a separable pair of dies have recesses in the confronting faces thereof cooperating to provide a cavity corresponding to the configuration of the exterior surface of the fitting desired and open at the edges of the die pair to accommodate entry therein of plungers engageable with a non-ferrous solid work piece pressed thereagainst by power-actuated means to reshape the work piece by cold flow around said plungers in annular passages between the plungers and walls of the die cavities.

A further object is to provide apparatus for producing a wrought non-ferrous pipe fitting, wherein a separable die has multiple communicating angularly disposed die passages of the configuration desired in the fitting to be produced in which plungers are shiftable concentrically and with clearance, one of said plungers having a travel in a die passage to a predetermined position and having associated therewith locking means for locking the same in said predetermined position, and a pair of opposed plungers being shiftable toward each other and against the solid work piece to cause the work piece to be reformed around said opposed plungers and around said locked plunger and to assume an exterior configuration conforming to the shape of the die cavity.

Other objects will be apparent from the following specification.

In the drawings:

FIG. 1 is a fragmentary elevational view of apparatus for making pipe fittings, with parts broken away and with the apparatus in open and inoperative position;

FIG. 2 is a perspective view of a work piece used in the device;

FIG. 3 is a perspective view of a pipe fitting formed by the apparatus by the practice of the present method;

FIG. 4 is a perspective view of another form of pipe fitting adapted to be manufactured by the apparatus and the use of the method;

FIG. 5 is an enlarged fragmentary sectional view of the apparatus taken on line 5—5 of FIG. 6 and illustrating the completion of the operation of the apparatus to form the body of a pipe fitting;

FIG. 6 is a transverse sectional view taken on line 6—6 of FIG. 5;

FIG. 7 is a sectional view taken on line 7—7 of FIG. 5;

FIG. 8 is a view similar to FIG. 5 and illustrating a modified embodiment of the invention;

FIG. 9 is a transverse sectional view taken on line 9—9 of FIG. 8;

FIG. 10 is a sectional view of a valve having a valve body formed by the method and apparatus forming the subject matter of this application;

FIG. 11 is a view similar to FIGS. 5 and 8 and illustrating another embodiment of the invention, and illustrating the work piece and the apparatus prior to the start of the operation of forming the pipe fitting in the apparatus; and FIG. 12 is a fragmentary sectional view taken on line 12—12 of FIG. 11.

Referring to the drawings which illustrate the preferred embodiment of the invention, and particularly to FIGS. 1, 5, 6 and 7 which illustrate one embodiment of the apparatus forming the subject matter of the invention, the numeral 20 designates the table or base of a machine, such as a press, having a table top or work platen 22. Uprights 24 project above the platen 22 and carry an elevated cross-head 26. A fixed die 28 is mounted upon the platen 22 and a movable die 30 is mounted on a die carrier 32 of a shiftable die actuator. In the form shown, the die actuator is illustrated as constituting hydraulic means, such as the hydraulic cylinder 34 carried by and depending from the cross-head 26 and mounting a piston therein (not shown) from which extends a piston rod 36 which mounts the die carrier 32. The cylinder 34 will be connected by means (not shown) to a source of liquid under pressure (not shown) under the control of actuating valves (not shown), in the manner well understood in the art, and will preferably be a double action hydraulic member to produce both upward and downward movement of the die part 30 under the control of a valve or like means. The stroke of the hydraulic member 34 will preferably be such that the confronting faces of the die parts 28 and 30 may be held firmly in contact or closed position at one limit of operation thereof, and the movable die 30 may be elevated to a position sufficiently spaced above the lower die 28 to accommodate application of work pieces thereto and removal of work pieces therefrom when the dies are opened.

The die parts 28 and 30 have flat contacting parting faces within each of which is formed one-half of a die cavity corresponding in shape to the shape of the pipe fitting to be produced. In the form shown in FIGS. 5, 6 and 7, each die member has a groove of arcuate cross-section extending thereacross to define entrance portions or runs 38 and 40 which preferably are of uniform cross-sectional size and shape throughout their length but which may be of any varying cross-sectional shape desired. A third groove of arcuate cross-section is formed at 42 and communicates with the grooves 38 and 40 centrally of the length of the combined groove 38–40 and extends to an edge of the die members. Thus the runs 38, 40 and 42 are substantially T-shaped, are preferably of arcuate cross-section, are preferably open at the edges of the die parts, and communicate at their inner ends. The T-shaped grooves are preferably formed with their axes lying in the plane of the parting faces of the dies so that each is preferably one-half of a die cavity formed when the dies are moved into contact at their parting faces, as illustrated in FIG. 6, as by actuation of the power member 34.

A plunger 44 is adapted to traverse the die cavity or entrance portion 38, and a plunger 46 is adapted to traverse the die cavity or entrance portion 40. Plungers 44 and 46 are preferably provided with power-actuated means, such as hydraulic power members 48 and 50, respectively, which may be double-acting cylinder-piston units of the character well known in the art. Suitable means (not shown) will preferably be provided for controlling the actuation of the power means 48 and 50 simultaneously to move the plungers 44 and 46 toward each other simultaneously or away from each other simultaneously. The power members 48 and 50 will be so positioned and oriented relative to the die 28 and will have such a stroke that the plungers 44 and 46 are co-axial and slide freely endwise in the die passages 38 and 40, respectively, when the upper die 30 has been closed into contact with the lower die, as illustrated in FIG. 6. In the form shown in FIG. 5, each of the plungers 44 and 46 has a snug sliding fit in the die cavities 38 and 40, respectively, and the inner end portion 45 of the plunger 44 and the inner end portion 47 of the plunger 46 is of reduced cross-sectional size and is preferably of uniform cross-sectional size and is centered with or coaxial with the plunger which mounts it. Thus, assuming that the die cavity portions 38 and 40 are circular in cross-section, plunger extensions 45 and 47 will similarly be of circular cross-sectional shape and will fit with clearance in the die cavity portions to provide annular passages around said reduced plunger portions 45 and 47 inwardly of the shoulders 49 of said plungers.

A third plunger 52 is aligned and coaxial with the die passage 42 and may be mounted by any suitable actuating means 54, such as a double-acting cylinder piston unit. The plunger 52 will preferably be of a cross-sectional size less than the cross-sectional size of the die passage 42 to provide an annular space within the die passage 42 therearound, as illustrated in FIGS. 5 and 6. The stroke of the actuator 54 will preferably be such as to position the inner end of the plunger 52 substantially flush with the adjacent walls of the runs 38 and 40 of the die cavity in its extended position, as illustrated in FIGS. 5 and 6. Also, as illustrated in FIG. 6, plunger 52 will preferably be concave at 55.

It will be understood that the plunger actuators 48 and 50 and 54 will preferably be fixedly mounted upon the table 22 of the machine, as illustrated in FIG. 1, although they may be mounted on any other suitable support. Suitable controls (not shown) will be provided to actuate the members 48, 50 and 54 in proper sequence and in proper relation to the actuation of the member 34.

In the embodiment of the invention illustrated in FIGS. 11 and 12, wherein parts similar to those in FIGS. 5 and 6 bear the same reference numerals, means are provided to lock the plunger 52 within the die cavity after the same has been urged to operative position by its actuating means 54. In this embodiment, the plunger 52 is provided with a flange 56 spaced from its free or inner end, and the run 42 of the die cavity is enlarged at 43 at its outer end to receive the flange 56 with clearance. The confronting faces of the die members 28 and 30 are provided with guide passages 58 extending transversely of the die passage 43 and adapted to receive slidably a bar 60 having a bifurcated end 62 adapted to enter the enlarged cavity portion 43 and to seat behind the flange 56 to provide a positive means for locking die plunger 52 in selected position against withdrawing movement endwise. It will be understood that the construction of the latch 62 is optional and may be varied as convenient. It will be understood that the latch mechanism 60, 62 will be actuable by suitable actuating means (not shown) preferably power-operated and preferably under the control of control means (not shown) which functions to actuate it to latching position after the movement of the actuator 54 to shift the plunger to operative position has been completed, and preferably before actuating of plungers 44 and 46 by the actuators 48 and 50 commences.

In the use of the apparatus, a work piece, preferably consisting of solid rod or bar stock 64, as seen in FIGS. 2, 11 and 12, is introduced into the die cavity when the die parts 28 and 30 are separated. The work piece 64 will preferably be of a size to have a snug fit within the die cavity and will preferably be positioned opposite the cavity run 42 and aligned with the cavity portions 38 and 40. The work piece will be formed of a ductible or malleable metal, such as copper.

After the work piece 64 has been positioned in the die cavity groove of the lower die 28 in proper position, the die is closed by actuator 34, bringing the parting faces of the die parts 28 and 30 into contact and maintaining them in contact. The actuator 54 advances the plunger 52 toward operative position with its inner end adjacent to but preferably spaced from the work piece 64. The actuator 54 may operate simultaneously with actuator 34 or subsequently thereto. The plunger 52 will be held positively in its operative position, as by locking the actuator 54 in its extended position or by operating a latching bar 60, 62 to engage behind a flange 56 on the plunger 52 after the plunger reaches operative position as illustrated in FIGS. 11 and 12. Thereupon, the actuators 48 and 50 are energized to advance the plungers 44 and 46 into their cooperating entrance cavity portions or runs 38 and 40 in the direction of each other and toward the work piece 64.

The actuators 48 and 50 are capable of exerting sufficient force to deform and reshape the work piece 64 within the die cavity incident to their advance toward each other. The operation entails a cold flow or extrusion of the metal of the work piece in each of the runs 38, 40 and 42 of the die cavity to form tubular or branch parts of a pipe fitting whose outer contour conforms to the configuration of the die cavity 38, 40, 42 and whose interior shape and wall thickness are determined by the contour and size of the work-engaging end portions 45 and 47 of the plungers 44 and 46 and the work-engaging end portion of the plunger 52. The size of the rod or bar stock work piece 64 is chosen to have a volume adequate to produce the pipe fitting desired when the plungers 44 and 46 reach the ends of their strokes and to provide webs therein between the inner ends of the plungers, as seen in FIGS. 5, 6 and 7. In other words, the volume of the work piece will preferably be such as to permit extrusion thereof to form the tubular cross-head 66 of the pipe fitting of desired length between the shoulders 49 of the plungers 44 and 46, and also to provide a branch conduit portion 68 of the fitting in the cavity run 42 of desired axial dimension while at the same time accommodating a cross-web 70 preferably of thin section in the cross-head 66 between the ends of the plunger portions 45 and 47 and a second web 72 spanning the branch part 68 of the pipe fitting at its junction with the cross-head 66 of the pipe fitting.

It will be apparent that the apparatus described above permits the performance of a one-step method of forming the body of a thin walled branch pipe fitting from inexpensive solid ductile metal work pieces. This method entails the operation of confining the ductile work piece in an open-ended die passage or cavity of a shape corresponding to the shape of the pipe fitting desired, and then subjecting the work piece to pressure to reshape the work piece by cold flow or extrusion within the die cavity around the end portions of plungers of smaller cross-sectional size than the cavity and fitting coaxially therein, and at least one of which is movable endwise to apply said pressure to the work piece, until such time as the work piece assumes the outer contour desired and is provided with the desired passages therethrough interrupted only by webs or diaphrams adjacent the central portion of the fitting provided in the clearance spaces between the plungers in the die cavity at the end of the forming operation.

The method of forming the pipe fitting is completed by drilling, punching or otherwise severing and removing the webs 70 and 72 and by squaring the ends of the various parts of the pipe fitting to remove flash and to control the dimensions of the pipe fitting.

It will be understood that in the apparatus illustrated in FIG. 1, the two plungers 44 and 46 are pressed inwardly simultaneously against the work piece. While this arrangement is preferred, it is possible that one of the plungers 44 and 46 can be shifted inwardly to a selected position, as seen in FIG. 5, and locked in that position, before the action of pressing the opposite plunger against the work piece to reshape it between the plungers commences.

In FIG. 4 is illustrated a pipe fitting wherein the end portions 74 of the cross-head 66 and the end portion 76 of the branch passage of the fitting are enlarged. It will be apparent that a fitting of this character can be formed by the method and the apparatus described above by the simple expedient of providing the die cavity runs 38, 40 and 42 and the plunger ends 45, 47 and 52 of a size and shape corresponding to the size and shape of the pipe fitting desired.

The method and apparatus herein described is particularly well suited for the manufacture of the body of a valve, as illustrated in FIG. 10, of the type forming the subject of my co-pending patent application, Ser. No. 859,701, filed December 15, 1959. The valve body is in the form of a T having aligned cross-passages 80 and 82 and a branch passage 84 with which is aligned a socket portion 86 extending transversely of and between the passages 80 and 82 and communicating therewith by reduced or restricted passage portions 81 and 83. A bonnet member 88 is screw-threaded to receive a portion 90 of a valve stem 92 which mounts a hand grip 94 at its outer end. An apertured cap 96 is screw-threaded on the outer end of the bonnet 88 and confines a gasket ring 98 surrounding the valve stem 92. A resilient sealing plug 100 is mounted upon the inner end of the stem 92 to move freely in the valve socket 86 to and from a retracted position in which the valve is open to accommodate flow through passage 80, restriction 81, socket 86, restriction 83 and passage 82. The closed position of the valve is illustrated in FIG. 10 in which the plug 100 is urged inwardly to seat at the inner end of the socket 86 and be pressed endwise to expand it radially into sealing contact with the valve socket walls 86 to thereby close communication between the opposite passages 80, 81 and 83, 82.

The apparatus for producing the body of this valve by the present method is illustrated in FIGS. 8 and 9 and entails the use of the dies 102 and 104 with their confronting contacting faces grooved to provide a die cavity having aligned entrance portions 106 and 108 communicating with each other and open at the opposite edges of the die and including a perpendicularly extending groove 110 communicating with the junction of the runs 106, 108 and open at its outer end at the edge of the die. A plunger 112 fits in the cavity portion 110 coaxially and with clearance to define an annular chamber in said cavity around said plunger. Plungers 114 extend into the die runs 106 and 108 and preferably fit snugly therein and are provided with concentric reduced dimension portions 116 preferably of cylindrical cross-section and terminate in reduced end portions 118 smaller than the portions 116 and of different cross-sectional configuration, being the cross-sectional configuration desired for the reduced passages 81 and 83 of the valve body, and here shown in FIG. 9 as having a narrow cross-sectional configuration with substantially flat opposite side faces.

The method of forming the valve body from a solid piece of ductile or malleable material in the die cavity 106, 108, 110 is the same as that described previously and preferably entails the insertion of a solid work piece, such as work piece 64 illustrated in FIG. 2, into the central portion of the die cavity of the lower die part while the die is open, followed by closing of the die and advance of the plunger 112 to operative position with its inner end terminating adjacent the die runs 106, 108. Thereupon, the plungers 114 are urged inwardly and pressed against the opposite ends of the work piece in the die cavity with sufficient force to reshape and reform the work piece to the configuration of the pipe fitting or valve body desired but characterized by the transverse web 120 centrally between the aligned passage portions 80 and 82 and by web 122 aligned with a part of the walls of the valve passages 80 and 82 and confronting the inner end of the plunger 112.

The valve body is removed from the die after withdrawal of the plungers 112, 114 and opening of the die, and the valve body is completed by trimming the ends of the valve portions 80, 82, 84 to desired length and square form and then drilling the fitting coaxially of the cross-passage 84 to remove the webs 120 and 122 and define a socket in the thickened body portions 124 formed around the reduced inner end portions 118 of the plungers 114, and also by providing suitable screw-threads as required, as upon the end of the branch portion 84.

In describing the apparatus and the method, reference has been made to utilization of presses, such as hydraulic press means, to exert the required force upon the work piece to cause it to reshape in the die cavity around the inner ends of the plungers. It will be understood that the apparatus is not limited to apparatus energized by hydraulic pressure nor to apparatus in the nature of a press. Thus it is also possible to utilize an impact machine to cause reshaping of the work piece by the plungers within the die cavity by impact rather than by the progressive deforming action of a press or hydraulic unit.

While the preferred embodiments of the invention have been illustrated and described, it will be understood that changes in the construction of the apparatus may be made within the scope of the appended claim without departing from the spirit of the invention.

I claim:

Apparatus for making thin walled branch pipe fittings, comprising a two-part separable die, the confronting faces of said die parts having communicating recesses extending to the edges thereof and cooperating to define a cavity conforming to the shape of said branch fitting and having an open ended run extending through said die and a communicating branch run, a branch plunger fitting in centered relation with said branch run with circumferential clearance throughout the length of said branch run, means shifting said branch plunger endwise in said centered relation in said branch run, means locking said branch plunger in a fixed predetermined position in said run with its inner end adjacent said open ended run, a pair of aligned plungers slidable in said open ended run and each having a reduced end portion fitting in said open ended run with clearance, and means forcing at least one of said aligned plungers endwise in centered relation in said open ended run from one end thereof to press the reduced end portion thereof against an imperforate body of ductile metal at substantially ambient temperature engaging the reduced end portion of the other aligned plunger to deform the metal body in said cavity around said reduced plunger ends and said fixedly positioned branch plunger.

(References on following page)

References Cited by the Examiner

UNITED STATES PATENTS

| | | | |
|---|---|---|---|
| 689,204 | 12/01 | Larkin | 29—157 |
| 869,476 | 10/07 | Beck | 78—9 |
| 1,445,140 | 2/23 | Kellogg et al. | 78—18 |
| 1,733,226 | 10/29 | Jones | 29—157.1 |
| 1,819,254 | 8/31 | Mantle | 207—6.1 |
| 1,946,117 | 2/34 | Sparks | 29—157.1 X |
| 2,025,973 | 12/35 | Cornell | 29—157 |
| 2,038,165 | 4/36 | Criley | 29—157 |
| 2,165,228 | 7/39 | Cornell | 29—157 |
| 2,165,454 | 7/39 | Cornell | 29—157 |
| 2,224,670 | 12/40 | Criley | 29—157 X |
| 2,302,115 | 11/42 | Gazey | 78—18 |
| 2,500,890 | 3/50 | Warzburger | 29—157 |

FOREIGN PATENTS

| | | |
|---|---|---|
| 197,119 | 5/23 | Great Britain. |
| 624,871 | 6/49 | Great Britain. |
| 548,189 | 9/56 | Italy. |

WHITMORE A. WILTZ, *Primary Examiner.*

HYLAND BIZOT, *Examiner.*